(12) United States Patent
Tesfagaber (10) Patent No.: US 10,674,869 B2
(45) Date of Patent: Jun. 9, 2020

(54) COOKING APPARATUS (71) Applicant: Zekarias K. Tesfagaber, Shoreline, WA (US)

(72) Inventor: Zekarias K. Tesfagaber, Shoreline, WA (US)

(*) Notice: Subject to any disclaimer, the term of this patent is extended or adjusted under 35 U.S.C. 154(b) by 195 days.

(21) Appl. No.: 15/706,330

(22) Filed: Sep. 15, 2017

(65) Prior Publication Data
US 2018/0023814 A1   Jan. 25, 2018

Related U.S. Application Data

(63) Continuation of application No. 15/463,729, filed on Mar. 20, 2017, now abandoned.

(60) Provisional application No. 62/324,748, filed on Apr. 19, 2016, provisional application No. 62/310,348, filed on Mar. 18, 2016.

(51) Int. Cl.
*A47J 37/06* (2006.01)
(52) U.S. Cl.
CPC ....... *A47J 37/0682* (2013.01); *A47J 37/0676* (2013.01)
(58) Field of Classification Search
CPC .......................... A47J 37/0676; A47J 37/0682
USPC ........................................................ 126/9 R
See application file for complete search history.

(56) References Cited

U.S. PATENT DOCUMENTS

| | | | | |
|---|---|---|---|---|
| 5,719,377 | A * | 2/1998 | Giebel | A47J 37/0676 219/391 |
| 6,029,566 | A * | 2/2000 | McLemore | A47J 37/0786 126/25 R |
| 6,323,466 | B1 | 11/2001 | Tesfagaber | |
| 6,603,099 | B2 * | 8/2003 | Gouthiere | A47J 27/04 219/401 |
| 7,053,338 | B1 | 5/2006 | Tesfagaber | |
| 2010/0037783 | A1 * | 2/2010 | Chen | A47J 37/0676 99/385 |

* cited by examiner

*Primary Examiner* — Grant Moubry
*Assistant Examiner* — Aaron H Heyamoto
(74) *Attorney, Agent, or Firm* — Tracy M Heims; Apex Juris, pllc.

(57) ABSTRACT

A cooking apparatus includes, but is not limited to, a bottom surface that lies at the bottom of a perimeter wall and having one or more stands operable to support a cooking plate, the perimeter wall having an angled edge; an electric heating element that can be interchangeably positioned on the one or more stands; a gas heating element that can be interchangeably positioned on the one or more stands; a cooking plate that is operable to seat on the base above the electric or gas heating element, is detachable from the base, and has an angled edge portion complimentary to that of the perimeter wall; a lid that is operable to rest over the cooking plate and extends beyond the perimeter edge of the cooking plate but completely covers the plate and allows for condensation to drip outside of the plate.

20 Claims, 6 Drawing Sheets

COOKING APPARATUS

PRIORITY CLAIM

This application is a continuation of U.S. non-provisional patent application Ser. No. 15/463,729 filed Mar. 20, 2017, which application claims the benefit of and/or is a non-provisional of U.S. Provisional Patent Application 62/310,348 filed Mar. 18, 2016 and U.S. Provisional Patent Application 62/324,748 filed Apr. 19, 2016. The foregoing applications are incorporated by reference in their entirety as if fully set forth herein.

FIELD OF THE INVENTION

This invention relates generally to a consumer product and, more specifically, to a cooking apparatus.

SUMMARY

In one embodiment, a cooking apparatus includes, but is not limited to, a bottom surface that lies at the bottom of a perimeter wall and having one or more stands operable to support a cooking plate, the perimeter wall having an angled edge; an electric heating element that can be interchangeably positioned on the one or more stands; a gas heating element that can be interchangeably positioned on the one or more stands; a cooking plate that is operable to seat on the base above the electric or gas heating element, is detachable from the base, and has an angled edge portion complimentary to that of the perimeter wall; a lid that is operable to rest over the cooking plate and extends beyond the perimeter edge of the cooking plate but completely covers the plate and allows for condensation to drip outside of the pan instead of onto the cooking plate.

In another embodiment, a cooking apparatus includes, but is not limited to, a bottom surface that lies at the bottom of a perimeter wall and having one or more stands operable to support a cooking plate, the perimeter wall having an angled edge; an electric heating element that can be interchangeably positioned on the one or more stands; a gas heating element that can be interchangeably positioned on the one or more stands; a cooking plate that is operable to seat on the base above the electric or gas heating element, is detachable from the base, and has an angled edge portion complimentary to that of the perimeter wall; a lid that is operable to rest over the cooking plate.

In another embodiment, a cooking apparatus includes, but is not limited to, a bottom surface that lies at the bottom of a perimeter wall and having one or more stands operable to support a cooking plate, the perimeter wall having an angled edge; a heating element that can be interchangeably positioned on the one or more stands; a cooking plate that is operable to seat on the base above the electric or gas heating element, is detachable from the base, and has an angled edge portion complimentary to that of the perimeter wall; a lid that is operable to rest over the cooking plate.

BRIEF DESCRIPTION OF THE DRAWINGS

Embodiments of the present invention are described in detail below with reference to the following drawings.

DETAILED DESCRIPTION

This invention relates generally to a consumer product and, more specifically, to a cooking apparatus. Specific details of certain embodiments of the invention are set forth in the following description and in FIGS. 1-6 to provide a thorough understanding of such embodiments. The present invention may have additional embodiments, may be practiced without one or more of the details described for any particular described embodiment, or may have any detail described for one particular embodiment practiced with any other detail described for another embodiment.

Figure 1:
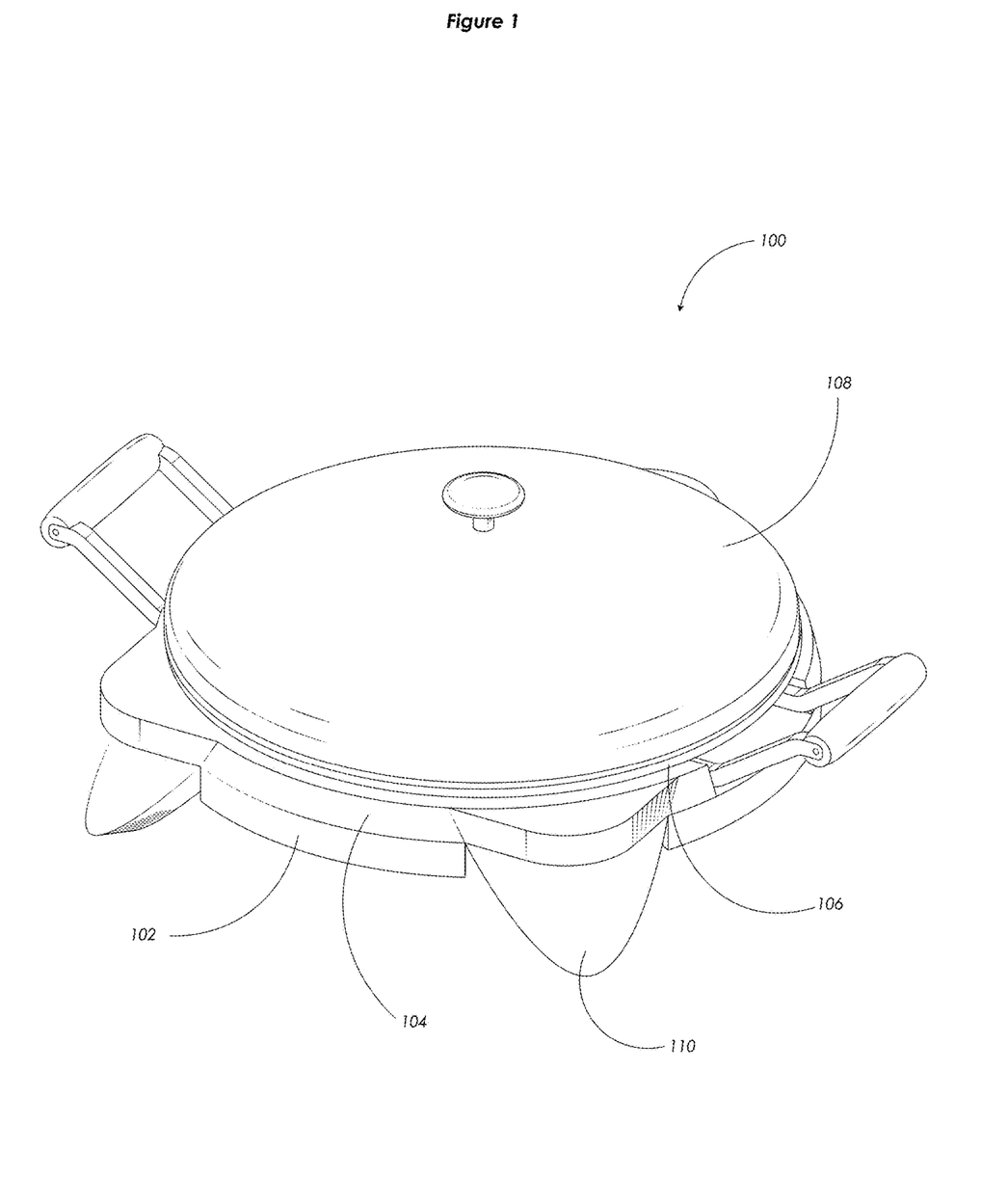
FIG. 1 is an isometric perspective of a cooking apparatus, in accordance with an embodiment of the invention.

FIG. 1 is an isometric perspective of a cooking apparatus, in accordance with an embodiment of the invention.

In one embodiment, an apparatus for cooking 100 includes, but is not limited to, a base 102 having a bottom surface that lies at the bottom of a perimeter wall 104, the base 102 having one or more stands operable to support a heating element, the perimeter wall 104 having a first angular edge operable to support a cooking plate 106; an electric heating element that is interchangeably positionable on the one or more stands of the base 102; a gas heating element that is interchangeably positionable on the one or more stands of the base 102; a cooking plate 106 comprised of a surface with a second angular edge portion that is operable to seat on the base 102 above either the electric or the gas heating element, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge of the cooking plate 106 such that the lid 108 fully covers the cooking plate 106 and allows for condensation to drip outside of the pan instead of onto the cooking plate 106; and one or more legs 110.

In one embodiment, the base 102 is defined by at least one of the following types of shapes: squared, rectangular, round, circular, polygonal, or trapezoidal.

In one embodiment, the bottom surface lies near, just above, a specified distance above, or a specified distance below the bottom of the perimeter of the perimeter wall 104.

The specified distance can be of various distances above or below the bottom of the perimeter wall 104. For example, it can be 0-1 inches above the perimeter wall 104, or 0-1 inches below the perimeter wall 104.

In one embodiment, the perimeter wall 104 comprises a border wall that encircles all of or a portion of the base 102. The portion can be comprised of a crenellation pattern, or can be unevenly distributed around the perimeter of the base 102.

In one embodiment, the angular edge of the perimeter wall 104 and complimentary angle of the cooking plate 106 are at a specified angle and complimentary angle relative to the surface of the base 102.

The specified angle can be of various degrees. For example, the specified angle can be 1-89 degrees and the complimentary angle is anywhere from 1-89 degrees such that the pair add up to 90 degrees and neither is zero degrees. The edges can also be curved, jagged, or possess a three-dimensional mechanical surface shape so long as they remain mirrored and complimentary to each other. The specified angle can be 30 degrees and the complimentary angle can be 60 degrees. Alternatively, the specified angle can be 45 degrees and the complimentary angle can be 45 degrees. Alternatively, the specified angle can be 10 degrees and the complimentary angle can be 80 degrees.

The electric and gas heating elements can be of different shape, or of the same shape. They should possess the same profile such that the two are interchangeable and will rest on the one or more stands regardless of which heating element is utilized, even if the exact layout of each element is different. The electrical heating element can be configured such that it is powered by a portable battery, portable generator, or connected to a conventional electrical outlet. The gas heating element can be configured to connect to a portable source of flammable gas or to a gas line. In some embodiments, a pilot light or other starter can be included with the gas heat source.

In one embodiment, the one or more stands are defined by at least one of the following types of shapes: half-cylindrical, pyramidal, polygonal, cuboid, prismatic, spherical, frustum, or circular, wherein the one or more stands are a specified height and wherein the one or more stands are arranged in a pattern around the base 102 defined by at least one of the following types of shapes: circle, X, line, triangle, square, hexagonal, pentagonal, octagonal.

In one embodiment, the one or more stands are a hook characterized by a single piece of metal with an area of 31.85 mm by 25.50 mm, with a 13.5 mm by 13.7 mm section with a U-shaped gap cut out and bent 90 degrees upward perpendicular to the original piece, two pieces bent 90 downward perpendicular to the original piece, and with a hole located in the remaining unbent area by which it can be attached to the base 102, such that the entire piece appears as an inverted Y when viewed from the axis on which the piece has been bent.

In another embodiment, the one or more stands are a hook characterized 130 by a single piece of metal with an area of 28 mm by 21.74 mm, with a 14.41 mm by 16 mm section with a U-shaped gap cut out bent 90 degrees upward perpendicular to the original area, such that the entire piece appears as an inverted T when viewed from the axis on which the piece has been bent.

In one embodiment, the gas heating element or electric heating element is attached to the one or more stands through a latch whereby the gas heating element or electric heating element is secured to the base 102, two plates compress and hold the gas heating element or electric heating element by friction, a hole wherein a peg on the gas heating element or electric heating element is inserted and held by a corresponding hole in the stand, or a channel wherein the gas heating element or electric heating element is slid.

The lid 108 can be variously sized and shaped. It can be defined by at least one of the following types of shapes: cylindrical, semi-spherical, spherical dome, pyramidal, polygonal, cuboid, conical, or prismatic.

In one embodiment, the lid 108 extends a specified radius beyond the edge of the cooking plate 106. The lid can have a specified radius of one half of an inch, such that it protrudes one half inch beyond the cooking plate uniformly on all sides. The specified radius of the lid 108, can range from 0.1 to 2 inches and may be varied around the lid 108 such that portions of the lid 108 protrude further from the edge of the cooking plate 106 than others. The lid 108 can also have a variable height, and can range from 0.5 inches to one foot.

The one or more legs 110 can be variously sized and shaped. It can be defined by at least one of the following types of shapes: half-cylindrical, semi-spherical, pyramidal, polygonal, cuboid, conical, prismatic, or frustum.

In one embodiment, an apparatus for cooking 100 includes, but is not limited to, a base 102 having a bottom surface that lies at the bottom of a perimeter wall 104, the base 102 having one or more stands operable to support a heating element, the perimeter wall 104 having a first angular edge operable to support a cooking plate 106; an electric heating element that is interchangeably positionable on the one or more stands of the base 102; a gas heating element that is interchangeably positionable on the one or more stands of the base 102; a cooking plate 106 comprised of a surface with a second angular edge portion that is operable to seat on the base 102 above either the electric or the gas heating element, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that rests over the cooking plate 106 that fully covers the cooking plate 106; and one or more legs 110.

In one embodiment, an apparatus for cooking 100 includes, but is not limited to, a base 102 having a bottom surface that lies at the bottom of a perimeter wall 104, the base 102 having one or more stands operable to support a heating element, the perimeter wall 104 having a first angular edge operable to support a cooking plate 106; a heating element that is positionable on the one or more stands of the base 102; a cooking plate 106 comprised of a surface with a second angular edge portion that is operable to seat on the base 102 above either the electric or the gas heating element, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge of the cooking plate 106 such that the lid 108 fully covers the cooking plate 106 and allows for condensation to drip outside of the pan instead of onto the cooking plate 106; and one or more legs 110.

Figure 2:
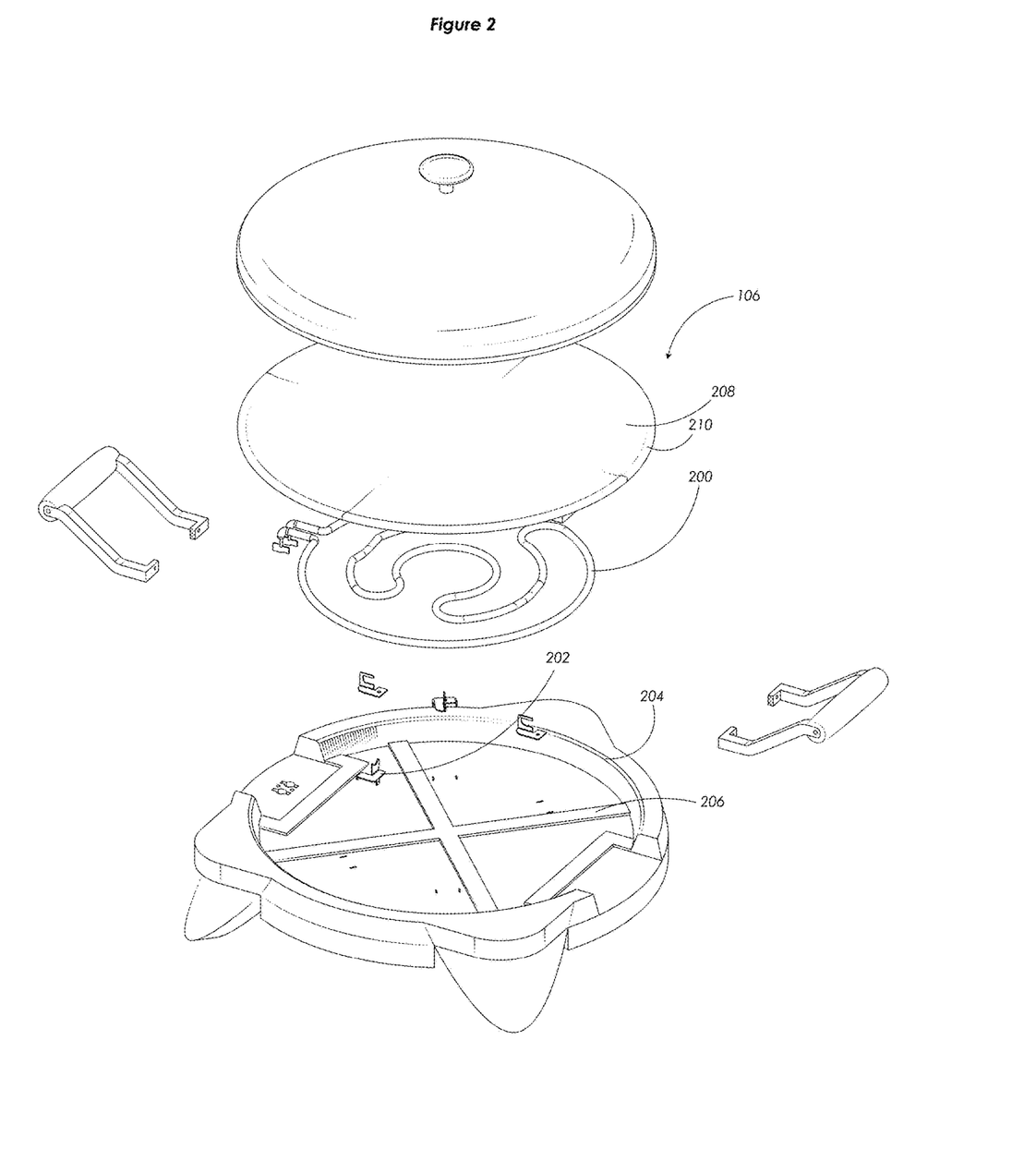
FIG. 2 is an isometric perspective of a cooking apparatus as individual components, in accordance with an embodiment of the invention.

FIG. 2 is an isometric perspective of a cooking apparatus as individual components, in accordance with an embodiment of the invention.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

In one embodiment, the base 102 is defined by at least one of the following types of shapes: squared, rectangular, round, circular, polygonal, or trapezoidal.

In one embodiment, the bottom surface 206 lies near, just above, a specified distance above, or a specified distance below the bottom of the perimeter of the perimeter wall 104.

The specified distance can be of various distances above or below the bottom of the perimeter wall 104. For example, it can be 0-1 inches above the perimeter wall 104, or 0-1 inches below the perimeter wall 104.

In one embodiment, the perimeter wall 104 comprises a border wall that encircles all of or a portion of the base 102. The portion can be comprised of a crenellation pattern, or can be unevenly distributed around the perimeter of the base 102.

In one embodiment, the angular edge of the perimeter wall 104 and complimentary angle of the cooking plate 106 are at a specified angle and complimentary angle relative to the surface of the base 102.

The specified angle can be of various degrees. For example, the specified angle can be 1-89 degrees and the complimentary angle is anywhere from 1-89 degrees such that the pair add up to 90 degrees and neither is zero degrees. The edges can also be curved, jagged, or possess a three-dimensional mechanical surface shape so long as they remain mirrored and complimentary to each other. The specified angle can be 30 degrees and the complimentary angle can be 60 degrees. Alternatively, the specified angle can be 45 degrees and the complimentary angle can be 45 degrees. Alternatively, the specified angle can be 10 degrees and the complimentary angle can be 80 degrees.

The electric and gas heating elements 200 can be of different shape, or of the same shape. The electric and gas heating elements 200 should possess the same profile such that the two are interchangeable and will rest on the one or more stands 202 regardless of which heating element 200 is utilized, even if the exact layout of each element 200 is different. The electrical heating element can be configured such that it is powered by a portable battery, portable generator, or connected to a conventional electrical outlet. The gas heating element can be configured to connect to a portable source of flammable gas or to a gas line. In some embodiments, a pilot light or other starter can be included with the gas heat source.

In one embodiment, the one or more stands 202 are defined by at least one of the following types of shapes: half-cylindrical, pyramidal, polygonal, cuboid, prismatic, spherical, frustum, or circular, wherein the one or more stands 202 are a specified height and wherein the one or more stands 202 are arranged in a pattern around the base 102 defined by at least one of the following types of shapes: circle, X, line, triangle, square, hexagonal, pentagonal, octagonal.

In one embodiment, the one or more stands 202 are a hook characterized by a single piece of metal with an area of 31.85 mm by 25.50 mm, with a 13.5 mm by 13.7 mm section with a U-shaped gap cut out and bent 90 degrees upward perpendicular to the original piece, two pieces bent 90 downward perpendicular to the original piece, and with a hole located in the remaining unbent area by which it can be attached to the base 102, such that the entire piece appears as an inverted Y when viewed from the axis on which the piece has been bent.

In another embodiment, the one or more stands are a hook characterized by a single piece of metal with an area of 28 mm by 21.74 mm, with a 14.41 mm by 16 mm section with a U-shaped gap cut out bent 90 degrees upward perpendicular to the original area, such that the entire piece appears as an inverted T when viewed from the axis on which the piece has been bent.

In one embodiment, the gas heating element or electric heating element is attached to the one or more stands through a latch whereby the gas heating element or electric heating element is secured to the base 102, two plates compress and hold the gas heating element or electric heating element by friction, a hole wherein a peg on the gas heating element or electric heating element is inserted and held by a corresponding hole in the stand, or a channel wherein the gas heating element or electric heating element is slid.

The lid 108 can be variously sized and shaped. It can be defined by at least one of the following types of shapes: cylindrical, semi-spherical, spherical dome, pyramidal, polygonal, cuboid, conical, or prismatic.

In one embodiment, the lid 108 extends a specified radius beyond the edge of the cooking plate 106. The lid can have a specified radius of one half of an inch, such that it protrudes one half inch beyond the cooking plate uniformly on all sides. The specified radius of the lid 108, can range from 0.1 to 2 inches and may be varied around the lid 108 such that portions of the lid 108 protrude further from the edge of the cooking plate 106 than others. The lid 108 can also have a variable height, and can range from 0.5 inches to one foot.

The one or more legs 110 can be variously sized and shaped. It can be defined by at least one of the following types of shapes: half-cylindrical, semi-spherical, pyramidal, polygonal, cuboid, conical, prismatic, or frustum.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that rests over the cooking plate 106 that fully covers the cooking plate 106; and one or more legs 110.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; a heating element 200 that is positionable on the one or more stands 202 of the base 102; a cooking plate 106 comprised of a surface with a second angular edge portion that is operable to seat on the base 102 above the heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

Figure 3:
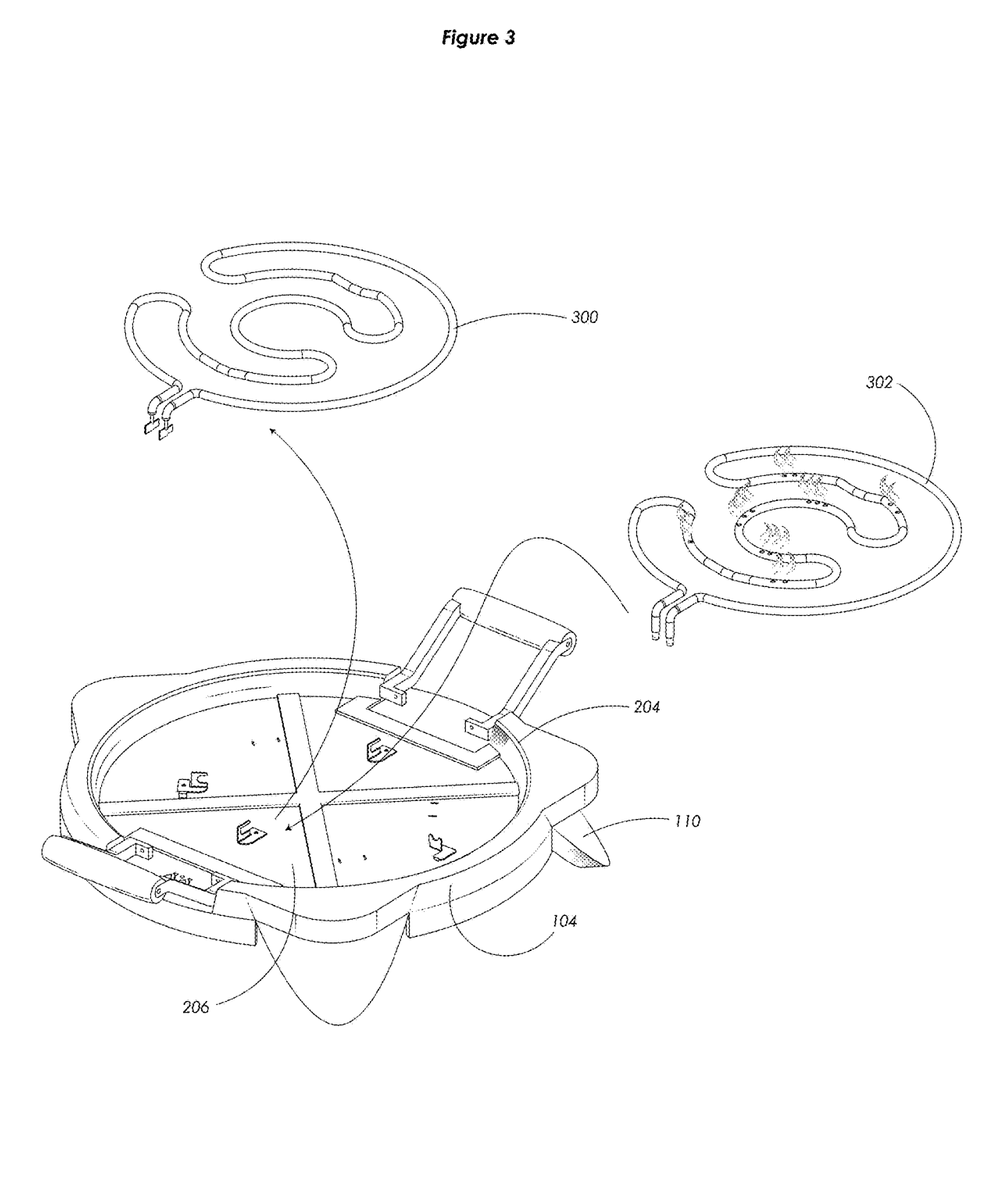
FIG. 3 is an isometric perspective of the base and two possible heating elements, in accordance with an embodiment of the invention.

FIG. 3 is an isometric perspective of the base and two possible heating elements, in accordance with an embodiment of the invention.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element 300 that is interchangeably positionable on the one or more stands 202 of the base 102; a gas heating element 302 that is interchangeably positionable on the one or more stands 202 of the base 102; a cooking plate 106 comprised of a surface with a second angular edge portion that is operable to seat on the base 102 above either the electric 300 or the gas heating element 302, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

In one embodiment, the base 102 is defined by at least one of the following types of shapes: squared, rectangular, round, circular, polygonal, or trapezoidal.

In one embodiment, the bottom surface 206 lies near, just above, a specified distance above, or a specified distance below the bottom of the perimeter of the perimeter wall 104.

The specified distance can be of various distances above or below the bottom of the perimeter wall 104. For example, it can be 0-1 inches above the perimeter wall 104, or 0-1 inches below the perimeter wall 104.

In one embodiment, the perimeter wall 104 comprises a border wall that encircles all of or a portion of the base 102. The portion can be comprised of a crenellation pattern, or can be unevenly distributed around the perimeter of the base 102.

In one embodiment, the angular edge of the perimeter wall 104 and complimentary angle of the cooking plate 106 are at a specified angle and complimentary angle relative to the surface of the base 102.

The specified angle can be of various degrees. For example, the specified angle can be 1-89 degrees and the complimentary angle is anywhere from 1-89 degrees such that the pair add up to 90 degrees and neither is zero degrees. The edges can also be curved, jagged, or possess a three-dimensional mechanical surface shape so long as they remain mirrored and complimentary to each other. The specified angle can be 30 degrees and the complimentary angle can be 60 degrees. Alternatively, the specified angle can be 45 degrees and the complimentary angle can be 45 degrees. Alternatively, the specified angle can be 10 degrees and the complimentary angle can be 80 degrees.

The electric and gas heating elements 200 can be of different shape, or of the same shape. The electric and gas heating elements 200 should possess the same profile such that the two are interchangeable and will rest on the one or more stands 202 regardless of which heating element 200 is utilized, even if the exact layout of each element 200 is different. The electrical heating element 300 can be configured such that it is powered by a portable battery, portable generator, or connected to a conventional electrical outlet. The gas heating element 302 can be configured to connect to a portable source of flammable gas or to a gas line. In some embodiments, a pilot light or other starter can be included with the gas heat source.

In one embodiment, the one or more stands 202 are defined by at least one of the following types of shapes: half-cylindrical, pyramidal, polygonal, cuboid, prismatic, spherical, frustum, or circular, wherein the one or more stands 202 are a specified height and wherein the one or more stands 202 are arranged in a pattern around the base 102 defined by at least one of the following types of shapes: circle, X, line, triangle, square, hexagonal, pentagonal, octagonal.

In one embodiment, the one or more stands 202 are a hook characterized by a single piece of metal with an area of 31.85 mm by 25.50 mm, with a 13.5 mm by 13.7 mm section with a U-shaped gap cut out and bent 90 degrees upward perpendicular to the original piece, two pieces bent 90 downward perpendicular to the original piece, and with a hole located in the remaining unbent area by which it can be attached to the base 102, such that the entire piece appears as an inverted Y when viewed from the axis on which the piece has been bent.

In another embodiment, the one or more stands are a hook characterized by a single piece of metal with an area of 28 mm by 21.74 mm, with a 14.41 mm by 16 mm section with a U-shaped gap cut out bent 90 degrees upward perpendicular to the original area, such that the entire piece appears as an inverted T when viewed from the axis on which the piece has been bent.

In one embodiment, the gas heating element 302 or electric heating element 300 is attached to the one or more stands through a latch whereby the gas heating element 302 or electric heating element 300 is secured to the base 102, two plates compress and hold the gas heating element 302 or electric heating element 300 by friction, a hole wherein a peg on the gas heating element 302 or electric heating element 300 is inserted and held by a corresponding hole in the stand, or a channel wherein the gas heating element 302 or electric heating element 300 is slid.

The one or more legs 110 can be variously sized and shaped. It can be defined by at least one of the following types of shapes: half-cylindrical, semi-spherical, pyramidal, polygonal, cuboid, conical, prismatic, or frustum.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element 300 that is interchangeably positionable on the one or more stands 202 of the base 102; a gas heating element 302 that is interchangeably positionable on the one or more stands 202 of the base 102; a cooking plate 106 comprised of a surface with a second angular edge portion that is operable to seat on the base 102 above either the electric 300 or the gas heating element 302, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that rests over the cooking plate 106 that fully covers the cooking plate 106; and one or more legs 110.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; a heating element 200 that is positionable on the one or more stands 202 of the base 102; a cooking plate 106 comprised of a surface with a second angular edge portion that is operable to seat on the base 102 above the heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

Figure 4:
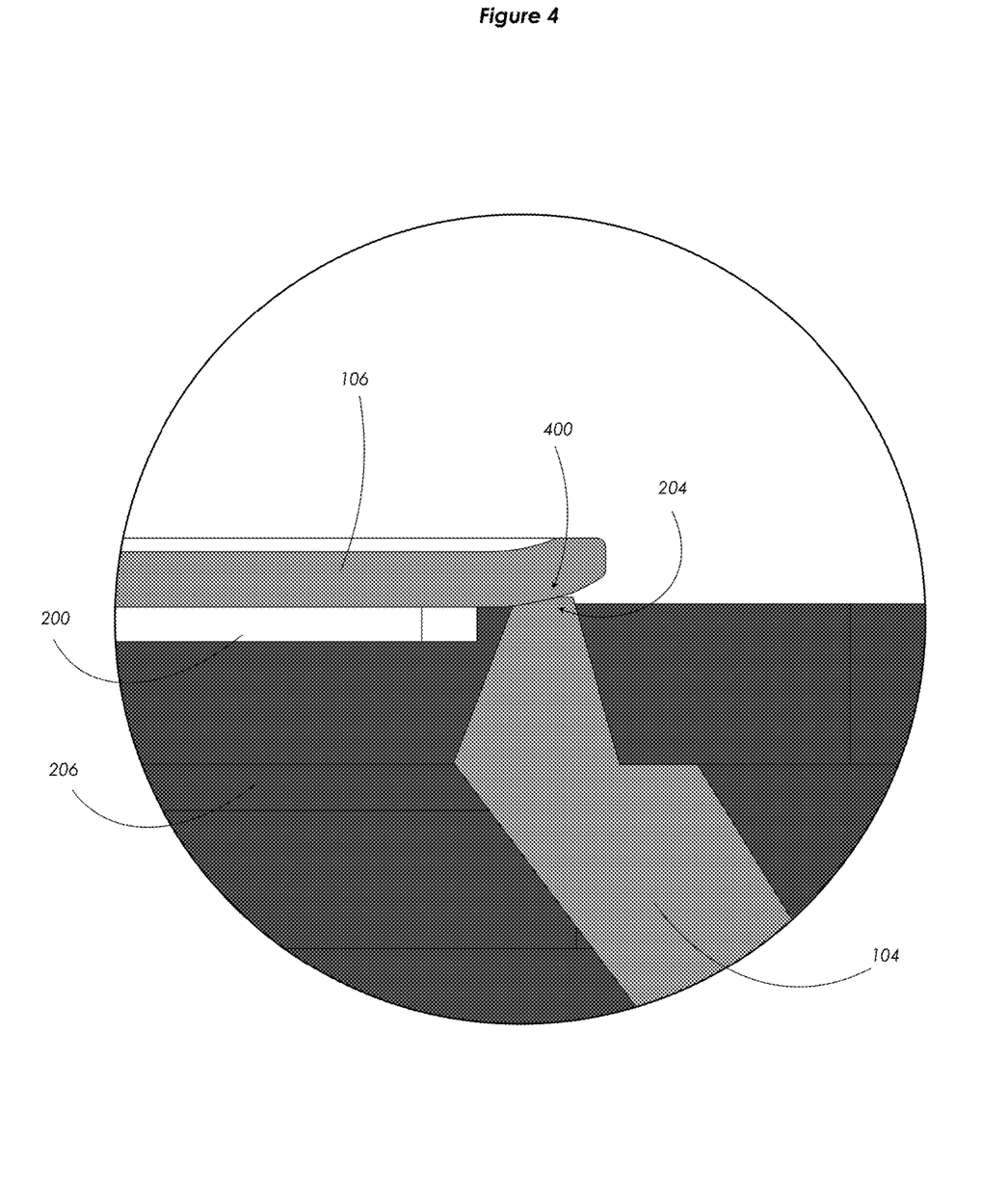
FIG. 4 is a side perspective of the interface between the cooking plate and base perimeter wall, in accordance with an embodiment of the invention.

FIG. 4 is a side perspective of the interface between the cooking plate and base perimeter wall, in accordance with an embodiment of the invention.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge 400 portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge 400 of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

In one embodiment, the bottom surface 206 lies near, just above, a specified distance above, or a specified distance below the bottom of the perimeter of the perimeter wall 104.

The specified distance can be of various distances above or below the bottom of the perimeter wall 104. For example, it can be 0-1 inches above the perimeter wall 104, or 0-1 inches below the perimeter wall 104.

In one embodiment, the perimeter wall 104 comprises a border wall that encircles all of or a portion of the base 102. The portion can be comprised of a crenellation pattern, or can be unevenly distributed around the perimeter of the base 102.

In one embodiment, the angular edge of the perimeter wall 104 and complimentary angle 400 of the cooking plate 106 are at a specified angle and complimentary angle 106 relative to the surface of the base 102.

The specified angle can be of various degrees. For example, the specified angle of the perimeter wall 104 can be 1-89 degrees and the complimentary angle is anywhere from 1-89 degrees such that the pair add up to 90 degrees and neither is zero degrees. The edges can also be curved, jagged, or possess a three-dimensional mechanical surface shape so long as they remain mirrored and complimentary to each other. The specified angle can be 30 degrees and the complimentary angle can be 60 degrees. Alternatively, the specified angle can be 45 degrees and the complimentary angle can be 45 degrees. Alternatively, the specified angle can be 10 degrees and the complimentary angle can be 80 degrees.

The electric and gas heating elements 200 can be of different shape, or of the same shape. The electric and gas heating elements 200 should possess the same profile such that the two are interchangeable and will rest on the one or more stands 202 regardless of which heating element 200 is utilized, even if the exact layout of each element 200 is different. The electrical heating element 300 can be configured such that it is powered by a portable battery, portable generator, or connected to a conventional electrical outlet. The gas heating element 302 can be configured to connect to a portable source of flammable gas or to a gas line. In some embodiments, a pilot light or other starter can be included with the gas heat source.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge 400 portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge 400 of the cooking plate 106; a lid 108 that rests over the cooking plate 106 that fully covers the cooking plate 106; and one or more legs 110.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; a heating element 200 that is positionable on the one or more stands 202 of the base 102; a cooking plate 106 comprised of a surface with a second angular edge 400 portion that is operable to seat on the base 102 above the heating element 200, the cooking plate 106 being detachable from the base 102 by lifting without use of fasteners and disposed by way of complimentary angles between the first angular edge of the perimeter wall 104 of the base 102 and second angular edge 400 of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

Figure 5:
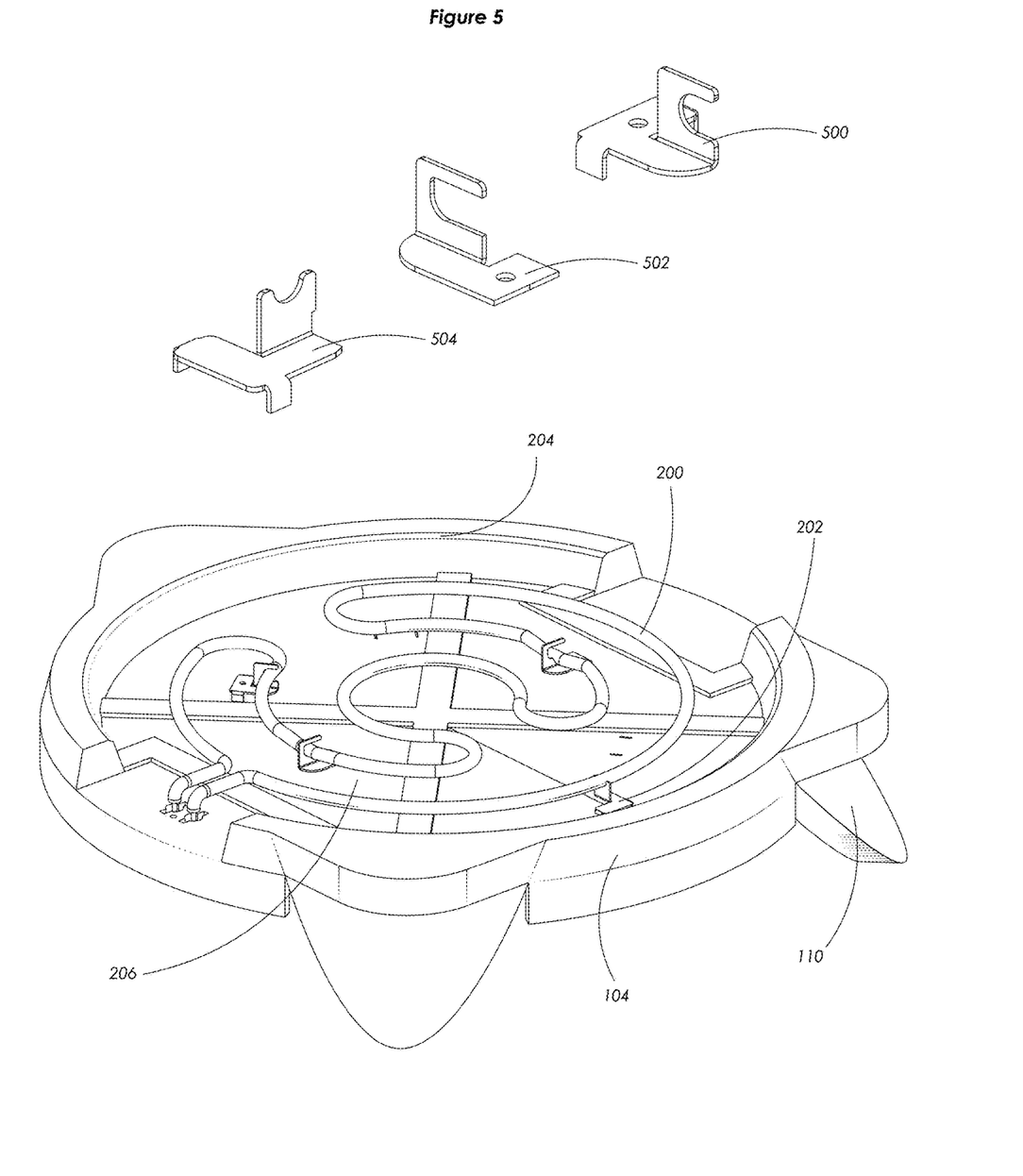
FIG. 5 is an isometric perspective of the base and variations of the heating element stands, in accordance with an embodiment of the invention.

FIG. 5 is an isometric perspective of the base and variations of the heating element stands, in accordance with an embodiment of the invention.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

In one embodiment, the base 102 is defined by at least one of the following types of shapes: squared, rectangular, round, circular, polygonal, or trapezoidal. The shapes can have even sides, or different length sides.

In one embodiment, the bottom surface 206 lies near, just above, a specified distance above, or a specified distance below the bottom of the perimeter of the perimeter wall 104.

The specified distance can be of various distances above or below the bottom of the perimeter wall 104. For example, it can be 0-1 inches above the bottom of the perimeter wall 104, or 0-1 inches below the bottom of the perimeter wall 104.

In one embodiment, the perimeter wall 104 comprises a border wall that encircles all of or a portion of the base 102. The portion can be comprised of a crenellation pattern, evenly distributed around the perimeter of the base 102, or can be unevenly distributed around the perimeter of the base 102.

In one embodiment, the angular edge of the perimeter wall 104 and complimentary angle of the cooking plate 106 are at a specified angle and complimentary angle relative to the surface of the base 102.

The specified angle can be of various degrees. For example, the specified angle can be 1-89 degrees and the complimentary angle is anywhere from 1-89 degrees such that the pair add up to 90 degrees and neither is zero degrees. The edges can also be curved, jagged, or possess a three-dimensional mechanical surface shape so long as they remain mirrored and complimentary to each other.

The electric and gas heating elements 200 can be of different shape, or of the same shape. The electric and gas heating elements 200 should possess the same profile such that the two are interchangeable and will rest on the one or more stands 202 regardless of which heating element 200 is utilized, even if the exact layout of each element 200 is different. The electrical heating element 300 can be configured such that it is powered by a portable battery, portable generator, or connected to a conventional electrical outlet. The gas heating element 302 can be configured to connect to a portable source of flammable gas or to a gas line. In some embodiments, a pilot light or other starter can be included with the gas heat source.

In one embodiment, the one or more stands 202 are defined by at least one of the following types of shapes: half-cylindrical, pyramidal, polygonal, cuboid, prismatic, spherical, frustum, or circular, wherein the one or more stands 202 are a specified height and wherein the one or more stands 202 are arranged in a pattern around the base 102 defined by at least one of the following types of shapes: circle, X, line, triangle, square, hexagonal, pentagonal, octagonal. The stands can take on a variety of configurations such as hooks 502, 500, or rests 504.

In one embodiment, the one or more stands 202 are a hook 500 characterized by a single piece of metal with an area of 31.85 mm by 25.50 mm, with a 13.5 mm by 13.7 mm section with a U-shaped gap cut out and bent 90 degrees upward perpendicular to the original piece, two pieces bent 90 downward perpendicular to the original piece, and with a hole located in the remaining unbent area by which it can be attached to the base 102, such that the entire piece appears as an inverted Y when viewed from the axis on which the piece has been bent.

In another embodiment, the one or more stands are a hook 502 characterized by a single piece of metal with an area of 28 mm by 21.74 mm, with a 14.41 mm by 16 mm section with a U-shaped gap cut out bent 90 degrees upward perpendicular to the original area, such that the entire piece appears as an inverted T when viewed from the axis on which the piece has been bent.

In one embodiment, the gas heating element or electric heating element is attached to the one or more stands through a latch whereby the gas heating element or electric heating element is secured to the base 102, two plates compress and hold the gas heating element or electric heating element by friction, a hole wherein a peg on the gas heating element or electric heating element is inserted and held by a corresponding hole in the stand, or a channel wherein the gas heating element or electric heating element is slid.

The one or more legs 110 can be variously sized and shaped. It can be defined by at least one of the following types of shapes: half-cylindrical, semi-spherical, pyramidal, polygonal, cuboid, conical, prismatic, or frustum.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that rests over the cooking plate 106 that fully covers the cooking plate 106; and one or more legs 110.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; a heating element 200 that is positionable on the one or more stands 202 of the base 102; a cooking plate 106 comprised of a surface with a second angular edge portion that is operable to seat on the base 102 above the heating element 200, the cooking plate 106 being detachable from the base 102 by lifting without use of fasteners and disposed by way of complimentary angles between the first angular edge of the perimeter wall 104 of the base 102 and second angular edge of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

Figure 6:
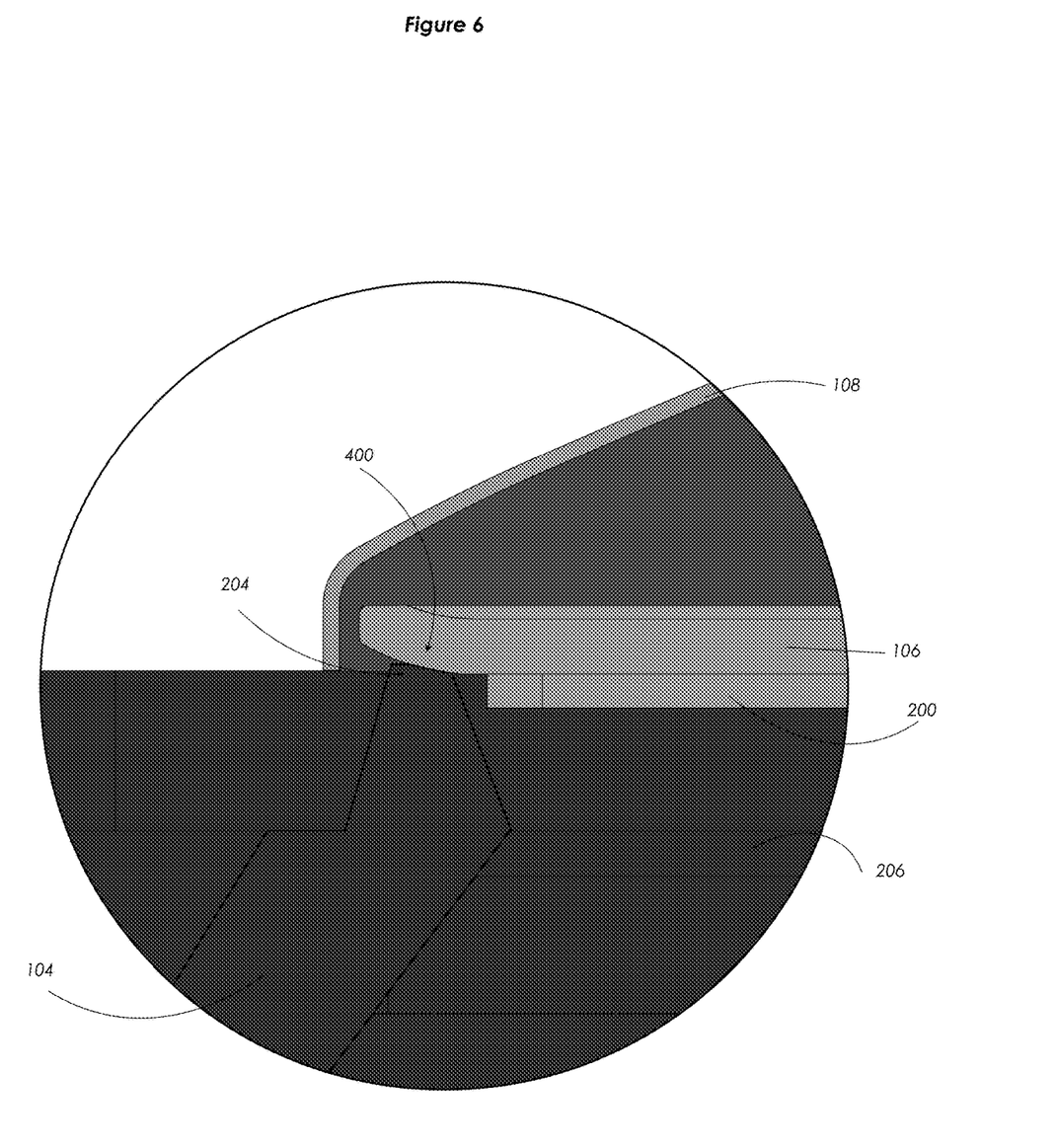
FIG. 6 is a side perspective of the gap between the cooking plate and lid, in accordance with an embodiment of the invention.

FIG. 6 is a side perspective of the gap between the cooking plate and lid, in accordance with an embodiment of the invention.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge 400 portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge 400 of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

In one embodiment, the bottom surface 206 lies near, just above, a specified distance above, or a specified distance below the bottom of the perimeter of the perimeter wall 104.

The specified distance can be of various distances above or below the bottom of the perimeter wall 104. For example, it can be 0-1 inches above the perimeter wall 104, or 0-1 inches below the perimeter wall 104.

In one embodiment, the perimeter wall 104 comprises a border wall that encircles all of or a portion of the base 102. The portion can be comprised of a crenellation pattern, or can be unevenly distributed around the perimeter of the base 102.

In one embodiment, the angular edge of the perimeter wall 104 and complimentary angle 400 of the cooking plate 106 are at a specified angle and complimentary angle relative to the surface of the base 102.

The specified angle can be of various degrees. For example, the specified angle of the perimeter wall 104 can be 1-89 degrees and the complimentary angle is anywhere from 1-89 degrees such that the pair add up to 90 degrees and neither is zero degrees. The edges can also be curved, jagged, or possess a three-dimensional mechanical surface shape so long as they remain mirrored and complimentary to each other. The specified angle can be 30 degrees and the complimentary angle can be 60 degrees. Alternatively, the specified angle can be 45 degrees and the complimentary angle can be 45 degrees. Alternatively, the specified angle can be 10 degrees and the complimentary angle can be 80 degrees.

The electric and gas heating elements 200 can be of different shape, or of the same shape. The electric and gas heating elements 200 should possess the same profile such that the two are interchangeable and will rest on the one or more stands 202 regardless of which heating element 200 is utilized, even if the exact layout of each element 200 is different. The electrical heating element 300 can be configured such that it is powered by a portable battery, portable generator, or connected to a conventional electrical outlet. The gas heating element 302 can be configured to connect to a portable source of flammable gas or to a gas line. In some embodiments, a pilot light or other starter can be included with the gas heat source.

The lid 108 can be variously sized and shaped. It can be defined by at least one of the following types of shapes: cylindrical, semi-spherical, spherical dome, pyramidal, polygonal, cuboid, conical, or prismatic.

In one embodiment, the lid 108 extends a specified radius beyond the edge of the cooking plate 106. The lid can have a specified radius of one half of an inch, such that it protrudes one half inch beyond the cooking plate uniformly on all sides. The specified radius of the lid 108, can range from 0.1 to 2 inches and may be varied around the lid 108 such that portions of the lid 108 protrude further from the edge of the cooking plate 106 than others. The lid 108 can also have a variable height, and can range from 0.5 inches to one foot.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; an electric heating element that is interchangeably positionable on the one or more stands 202 of the base 102; a gas heating element that is interchangeably positionable on the one or more stands 202 of the base 102; a cooking plate 106 comprised of a surface with a second angular edge 400 portion that is operable to seat on the base 102 above either the electric or the gas heating element 200, the cooking plate 106 being detachable from the base 102 by lifting without use of fasteners and disposed by way of complimentary angles between the first angular edge of the perimeter wall 104 of the base 102 and second angular edge 400 of the cooking plate 106; a lid 108 that rests over the cooking plate 106 that fully covers the cooking plate 106; and one or more legs 110.

In one embodiment, an apparatus for cooking 100 includes, but is not limited to, a base 102 having a bottom surface 206 that lies at the bottom of a perimeter wall 104, the base 102 having one or more stands 202 operable to support a heating element 200, the perimeter wall 104 having a first angular edge 204 operable to support a cooking plate 106; a heating element 200 that is positionable on the one or more stands 202 of the base 102; a cooking plate 106 comprised of a surface with a second angular edge 400 portion that is operable to seat on the base 102 above the heating element 200, the cooking plate 106 being detachable from the base 102 by lifting without use of fasteners and disposed by way of complimentary angles between the first angular edge of the perimeter wall 104 of the base 102 and second angular edge 400 of the cooking plate 106; a lid 108 that is operable to rest over the cooking plate 106 and that extends beyond a perimeter edge 210 of the cooking plate 106 such that the lid 108 fully covers the cooking plate 106 and allows for condensation to drip outside of the pan instead of onto the cooking plate 106; and one or more legs 110.

While preferred and alternate embodiments of the invention have been illustrated and described, as noted above, many changes can be made without departing from the spirit and scope of the invention. Accordingly, the scope of the invention is not limited by the disclosure of these preferred and alternate embodiments. Instead, the invention should be determined entirely be reference to the claims that follow.

What is claimed is:

1. An apparatus for cooking comprising:
   a base having a bottom surface that lies at the bottom of a perimeter wall, the base having one or more stands operable to support a heating element that is removably received on the one or more stands, wherein the one or more stands comprises an opening configured to hold the heating element such that all of said openings of the one or more stands is pointed towards a cooking plate or the perimeter wall;
   the perimeter wall having a first angular edge operable to support the cooking plate wherein the cooking plate is comprised of a surface with a second angular edge portion that is operable to seat on the base above the heating element, the cooking plate being detachable from the base by lifting without use of fasteners and disposed by way of complimentary angles between the first angular edge of the perimeter wall of the base and second angular edge of the cooking plate;
   a lid that is operable to rest over the cooking plate and that extends beyond a perimeter edge of the cooking plate such that the lid fully covers the cooking plate and allows for condensation to drip outside of the pan instead of onto the cooking plate; and
   one or more legs.

2. The apparatus of claim 1, wherein the base is defined by at least one of the following types of shapes: squared, rectangular, round, circular, polygonal, or trapezoidal.

3. The apparatus of claim 1, wherein the bottom surface lies near, just above, a specified distance above, or a specified distance below the bottom of the perimeter of the perimeter wall.

4. The apparatus of claim 3, wherein the specified distance above is 0 to 1 inch.

5. The apparatus of claim 3, wherein the specified distance below is 0 to 1 inch.

6. The apparatus of claim 1, wherein the perimeter wall comprises a border wall that encircles all of or a portion of the base.

7. The apparatus of claim 1, wherein the angular edge of the perimeter wall and complimentary angle of the cooking plate are at a specified angle and complimentary angle relative to the surface of the base.

8. The apparatus of claim 7, wherein the specified angles add up to 90 degrees with neither angle being 0.

9. The apparatus of claim 1, wherein the one or more stands are defined by at least one of the following types of shapes: half-cylindrical, pyramidal, polygonal, cuboid, prismatic, spherical, frustum, or circular, wherein the one or more stands are a specified height and wherein the one or more stands are arranged in a pattern around the base defined by at least one of the following types of shapes: circle, X, line, triangle, square, hexagonal, pentagonal, octagonal.

10. The apparatus of claim 1, wherein the one or more stands are more than one and where the stands are of at least two differing styles that are designed to support, hold or secure said heating element in place.

11. The apparatus of claim 10, wherein one of the more than one stands is a hook stand that is characterized by a single piece of metal with a U-shaped gap cut out bent upward perpendicular to the original area, such that the entire piece appears as an inverted T when viewed from the axis on which the piece has been bent and another of the more than one stands is a hook characterized by a single piece of metal with a U-shaped gap cut out and bent upward perpendicular to the original piece, two pieces bent downward perpendicular to the original piece, and with a hole located in the remaining unbent area by which it can be attached to the base, such that the entire piece appears as an inverted Y when viewed from the axis on which the piece has been bent.

12. The apparatus of claim 10, wherein the heating element is attached to the one or more stands through a latch whereby the heating element is secured to the base, two plates compress and hold the heating element by friction, a hole wherein a peg on the heating element is inserted and held by a corresponding hole in the stand, or a channel wherein the heating element is slid.

13. The apparatus of claim 1, wherein the lid is defined by at least one of the following types of shapes: cylindrical, semi-spherical, spherical dome, pyramidal, polygonal, cuboid, conical, or prismatic and where said lid extends a specified radius beyond the edge of the cooking plate.

14. The apparatus of claim 1, wherein the heating element is gas or electric.

15. The apparatus of claim 13, wherein the specified radius is one-half inch.

16. The apparatus of claim 1, wherein the lid has a specified radius and specified height and is in the shape of a spherical dome.

17. The apparatus of claim 16, wherein the lid has a specified height of at least two inches and the lid has a specified radius of at least one foot.

18. The apparatus of claim 1, wherein the legs are defined by at least one of the following types of shapes: half-cylindrical, semi-spherical, pyramidal, polygonal, cuboid, conical, prismatic, or frustum.

19. An apparatus for cooking comprising:
   a base having a bottom surface that lies at the bottom of a perimeter wall, the base having one or more stands operable to support a heating element, the perimeter wall having a first angular edge operable to support a cooking plate wherein the one or more stands comprises an opening configured to hold the heating element, such that all of said openings of the one or more stands is pointed towards a cooking plate or the perimeter wall;
   an electric heating element that is removably received on the one or more stands of the base;
   a gas heating element that is removably received on the one or more stands of the base;
   the cooking plate comprised of a surface with a second angular edge portion that matingly engages with said base perimeter wall and where said plate is not fixed or secured to said base;

a lid that rests over the cooking plate that fully covers the cooking plate; and one or more legs.

20. An apparatus for cooking comprising:

a base having a bottom surface that lies at the bottom of a perimeter wall, the base having one or more stands operable to support a heating element, the perimeter wall having a first edge operable to support a cooking plate wherein the one or more stands comprises an opening configured to hold the heating element, such that all of said openings of the one or more stands is pointed towards a cooking plate or the perimeter wall;

the heating element is removably received on the one or more stands of the base;

the cooking plate comprised of a surface with a portion that is operable to seat on the base above the heating element, the cooking plate matingly engages with said base perimeter wall and is not fixed or secured to the base;

a lid that is operable to rest over the cooking plate and that extends beyond a perimeter edge of the cooking plate such that the lid fully covers the cooking plate and allows for condensation to drip outside of the pan instead of onto the cooking plate; and one or more legs.

* * * * *